UNITED STATES PATENT OFFICE.

GEORGE B. FRANKFORTER, OF THE UNITED STATES ARMY.

PROCESS FOR THE PREPARATION OF HYDRIODIC ACID.

1,380,951.     Specification of Letters Patent.     Patented June 7, 1921.

No Drawing.     Application filed June 4, 1919. Serial No. 301,802.

(FILED UNDER THE ACT OF MARCH 3, 1883, 22 STAT. L., 625.)

*To all whom it may concern:*

Be it known that I, GEORGE B. FRANKFORTER, of the U. S. Army, a citizen of the United States, stationed at Washington, D. C., have invented an Improvement in Process for the Preparation of Hydriodic Acid, of which the following is a specification.

The invention described herein may be used by the Government, or any of its officers or employees in prosecution of work for the Government, or by any other person in the United States, without payment to me of any royalty thereon.

My invention relates to a new and improved process for the preparation of hydriodic acid, either as the pure dry gas or as the aqueous solution. As is well known, hydriodic acid can not be made satisfactorily by treating an iodid with sulfuric acid as in the case of the preparation of hydrochloric acid from a chlorid and sulfuric acid. This is on account of the powerful reducing properties of the acid. Thus, when an iodid, for example, potassium iodid, is treated with sulfuric acid, some hydriodic acid is liberated but in addition to the acid some iodin is set free. At the same time hydriodic acid, on account of its powerful reducing power, reacts with the sulfuric acid changing some of it to sulfurous acid and some to hydrogen sulfid. As a result of this reduction, the yield of hydriodic acid is very small and the acid is very impure. The preparation of hydriodic acid must therefore, be other than the analogous method for the preparation of hydrofluoric or hydrochloric acids.

Several methods have been used for the preparation of hydriodic acid. All of them, however, have some objectionable features; either the process does not give a pure product and a good yield or it is too expensive and the apparatus too complex for satisfactory economic production. My process eliminates these objections.

It was found in working with the terpenes such as commercial pinene, usually termed common pinene or with rosin oil, that when iodin is brought in contact with them, even at the ordinary temperature, a vigorous reaction takes place between the organic compound and the iodin forming hydriodic acid and an iodo-compound of the organic substance. The latter on standing or on heating breaks off hydriodic acid and a condensed form of the organic substance is formed. There action may be represented by the following typical equation:—

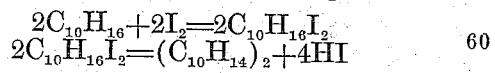

$$2C_{10}H_{16} + 2I_2 = 2C_{10}H_{16}I_2$$
$$2C_{10}H_{16}I_2 = (C_{10}H_{14})_2 + 4HI$$

In certain cases, the reaction is not so simple as the above and some of the iodin is held combined with the organic substance. In cases where iodin is held as a definite compound, it is necessary to heat the substance in order to liberate the iodin as the acid. In a few cases the reaction is so violent as to produce an explosion.

To prepare hydriodic acid by my process, a certain amount of the active reagent is placed in a generating flask connected with a condenser and iodin cautiously allowed to drop into it. As soon as the iodin comes in contact with the reagent, hydriodic acid gas is rapidly liberated passing over into the condenser as heavy white fumes. These fumes consisting of the moist acid are passed through a tube containing red phosphorus to remove any free iodin which may have been carried over by the acid. The purified gas thus formed may be either condensed, used in the gaseous state or passed into water to form the aqueous solution. If the temperature is properly regulated, the liberation of gas may be easily controlled. The iodin may be added either as the solid or in solution.

In addition to the terpenes, other hydrocarbons, for instance, hexylene, and more especially the unsaturated ones react in similar manner. Certain oxy compounds also react with iodin as, for example, the aldehydes and alcohols and more especially the unsaturated ones. While the unsaturated hydrocarbons and oxy compounds are especially adapted to this reaction it is to be understood that the invention is not limited to the use of the unsaturated form but that the saturated form may also be used.

Having thus described my process for the preparation of hydriodic acid by bringing iodin in contact with certain organic compounds, either at room temperature or at higher temperature, what I claim and desire protection in by Letters Patent is:—

1. A simple continuous process for the preparation of hydriodic acid by bringing iodin in contact with common pinene and subsequently removing all of the hydriodic acid by distillation.

2. A process of making hydriodic acid by bringing pure iodin in contact with rosin oil and subsequently removing the hydriodic acid from the mixture by heating.

3. A process of preparing hydriodic acid by treating unsaturated hydrocarbons with iodin and subsequently removing the hydriodic acid formed by heating or distilling.

4. A process of preparing hydriodic acid by heating an unsaturated aldehyde with iodin and subsequently removing the hydriodic acid formed by heating.

5. A process of preparing hydriodic acid by heating an alcohol with iodin and subsequently removing the hydriodic acid formed by heating.

6. A process of making hydriodic acid by bringing iodin in contact with a terpene and removing the hydriodic acid from the mixture by heating.

7. A process of making hydriodic acid by bringing iodin in contact with an unsaturated oxy compound, removing the hydriodic acid from the mixture by heating and removing impurities from the acid.

8. A process of making hydriodic acid by placing a terpene in a receptacle, adding iodin to the terpene and collecting the hydriodic acid gas given off.

9. A process of making hydriodic acid by placing a terpene in a receptacle, adding iodin to the terpene, removing the free iodin from the hydriodic acid gas given off and collecting the gas.

10. A process of making hydriodic acid by placing a terpene in a receptacle, adding iodin to the terpene and passing the hydriodic acid gas given off over red phosphorus to remove the free iodin.

11. A process of making hydriodic acid by placing an unsaturated hydrocarbon in a receptacle, adding iodin, and collecting the gas given off.

12. A process of making hydriodic acid by placing an unsaturated hydrocarbon in a receptacle, adding iodin, removing the free iodin from the hydriodic acid gas given off and collecting the gas.

13. A process of making hydriodic acid, by placing an unsaturated hydrocarbon in a receptacle, adding iodin, passing the hydriodic acid over red phosphorus to remove impurities and collecting the gas.

14. A process of making hydriodic acid by placing an unsaturated oxy-compound in a receptacle, adding iodin, removing the impurities from the resulting gas and collecting the gas given off.

15. A process of making hydriodic acid by placing an unsaturated oxy-compound in a receptacle, adding iodin thereto, removing the free iodin from the hydriodic acid gas given off and collecting the gas.

16. A process of making hydriodic acid by placing an unsaturated oxy-compound in a receptacle, adding iodin, passing the hydriodic acid gas given off over red phosphorus to remove impurities and collecting the gas.

17. A process of making hydriodic acid by slowly adding iodin to an unsaturated hydrocarbon and collecting the hydriodic acid gas given off.

GEORGE B. FRANKFORTER.